GEORGE E. MOUL, JR.
INVENTOR.

Oct. 17, 1961  G. E. MOUL, JR  3,004,645
AERODYNAMIC SURFACE ATTACHING STRUCTURE
Filed Aug. 27, 1959  2 Sheets-Sheet 2

GEORGE E. MOUL, JR.
INVENTOR.

BY
Q. Barton Warner
Claude Funkhouser
ATTORNEYS

United States Patent Office 3,004,645
Patented Oct. 17, 1961

3,004,645
AERODYNAMIC SURFACE ATTACHING STRUCTURE
George E. Moul, Jr., Washington, D.C., assignor to the United States of America as represented by the Secretary of the Navy
Filed Aug. 27, 1959, Ser. No. 836,563
5 Claims. (Cl. 189—88)

This invention relates generally to aerial vehicle structure; more particularly, it relates to improved structure for attaching an aerodynamic surface, such as a dorsal fin or a wing, to an aerial missile.

It is an object of this invention to provide an aerial vehicle wing attaching structure having no moving parts.

A further object of the invention is to provide aerial vehicle wing attaching structure so constructed that a wing may be readily attached to such a vehicle under field operation conditions.

Another object of this invention is to provide aerial missile wing attaching structure so designed that a wing will require a minimum time for attachment to the missile.

It is also an object of the invention to provide aerial missile wing attaching structure that will be capable of withstanding aerodynamic forces acting thereon.

A still further object of the invention is to provide aerial missile wing attaching structure having means therein to prevent accidental disassembly.

Another object of the invention is to provide aerial missile wing attaching structure having means therein to aid in the assembly thereof.

Other objects and many of the attendant advantages of this invention will be readily appreciated as the same becomes better understood by reference to the following detailed description when considered in connection with the accompanying drawings, wherein.

This invention relates to structure for attaching a dorsal fin, or wing, to an aerial missile. Such fins are subject to great aerodynamic loading in flight and, hence, must be securely attached to the missile. Previously dorsal fins have been attached by the use of fasteners such as screws, a procedure involving considerable time and a large number of elements. Moreover, because of the time consumed in using such attaching means it was normally impractical to attach the fins under field operating conditions. Because space and handling requirements are much less for unassembled than for assembled components it is highly desirable that it be practical to assemble the dorsal fins on the missile body in the field just prior to missile launch. It is therefore the purpose of the present invention to provide a dorsal fin attaching structure that has the required strength, that has a minimum number of elements, that takes minimum time to assemble, and that, therefore, can be easily assembled under field operating conditions.

Figure 1:
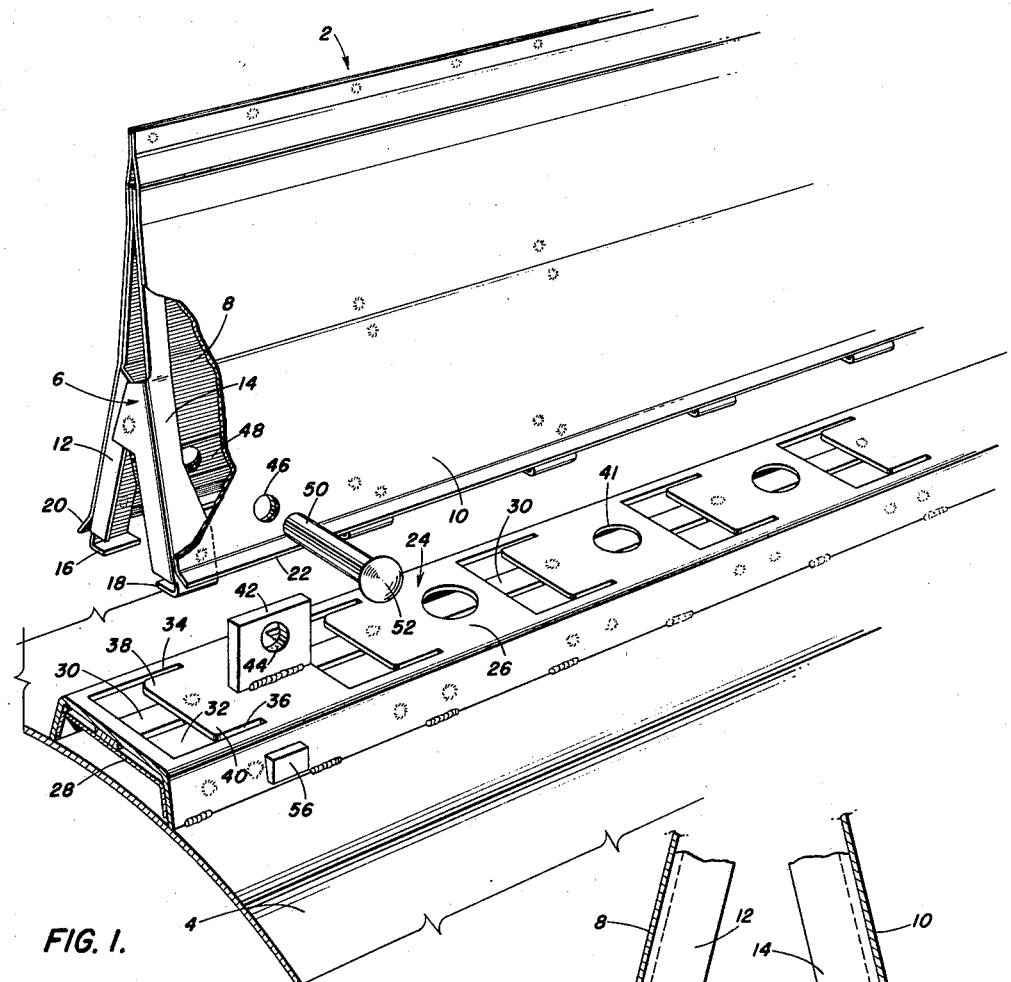
FIG. 1 is a fragmentary perspective view of a dorsal fin and an aerial missile body, in unassembled position, showing the attaching structure of the present invention.
Figure 2:
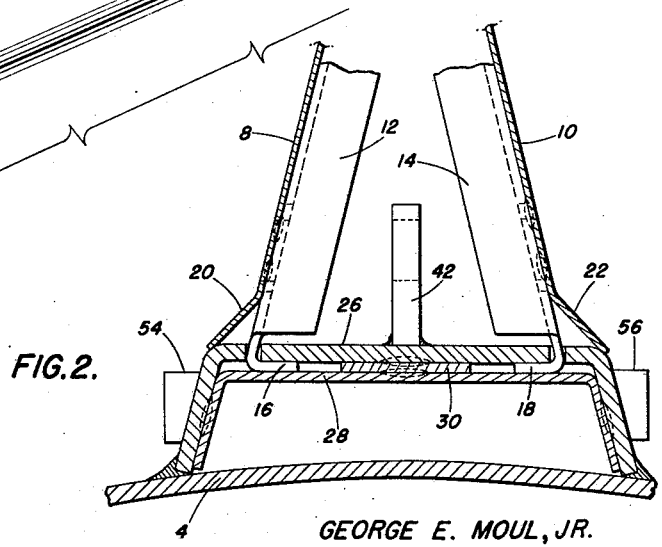
FIG. 2 is a detail section of a dorsal fin and an aerial missile body in assembled position.

Referring to the drawings, a dorsal fin is shown at 2 and a missile body at 4. While only one fin is shown, it is to be understood that in normal missile construction a plurality of such fins are employed. The dorsal fin 2 consists of a plurality of spaced ribs 6 upon which are secured, as by welding, a pair of oppositely disposed skin material elements 8 and 10. Each rib 6 comprises a pair of rib legs 12 and 14, said legs having opposed feet or tabs 16 and 18, respectively, projecting substantially horizontally from the bottom thereof. As shown in the drawing, the rib legs 12 and 14 are formed separately and are thereafter secured together by welding to form the rib 6. Obviously, said rib 6 could be constructed other than as shown, such as by forming the rib legs 12 and 14 of a single piece of material, without departing from the spirit or scope of the invention. The lower edges of the skin elements 8 and 10 are bent outwardly to form skirts 20 and 22, respectively, whereby to maintain the aerodynamic flow lines of the structure when in the assembled position shown in FIG. 2.

Attached to the missile body 4, as by welding, is an inverted U-shaped anchor strip, generally designated by the numeral 24. Said anchor strip 24 comprises an outer channel 26, an inner channel 28 disposed within and secured to said outer channel, and a spacer strip 30 disposed between and secured to each of said outer and inner channels. While the drawing shows weld securing means, it is obvious that any other suitable means, such as rivets, could also be employed.

The outer channel 26 has a plurality of longitudinally spaced rectangular openings 32 therein, the number and spacing of such openings corresponding to those of the ribs 6. Each opening 32 is of sufficient length and width to receive therein the lower ends of the spaced rib legs 12 and 14 with their attached feet 16 and 18. A pair of parallel slots 34 and 36 extend from each of the openings, the distance between the centerlines of said slots being substantially the same as the distance between the centerlines of the lower ends of said spaced rib legs 12 and 14 at the point where they join the feet 16 and 18. The spacer strip 30 is of substantially the same thickness as the feet 16 and 18 whereby the outer 26 and inner 28 channels are spaced a distance sufficient to accommodate said feet therebetween.

To assemble the dorsal fin on the missile body the spaced ribs 6 are first brought into alignment with the openings 32. The lower ends of the spaced rib legs 12 and 14 with their attached feet 16 and 18 are then inserted into said openings after which the fin is moved longitudinally with respect to the missible body, when the lower portions of the rib legs 12 and 14 will enter the slots 34 and 36, thereby securing said dorsal fin to said missile body. By maintaining all clearances at a minimum a tight fit is obtained which normally is sufficient to maintain the elements is assembled condition. The corners 38 and 40 at the points where the slots 34 and 36 open into the opening 32 may, if desired, be slightly rounded in order to facilitate the assembly operation. Holes 41 may, if it is so diresired, be placed in the outer channel 26 for purposes of weight reduction.

The specific spacing of the ribs and their corresponding openings, as well as the materials and dimensions of the elements, are matters of design and are mainly dependent on the amount of aerodynamic loading that must be resisted.

As has been stated, the tight fit between the elements is normally sufficient to maintain them in assembled position. However, an additional means may also be employed to insure that the dorsal fin remains attached to the missile body 4. Such a means is shown in the drawing and includes a lug 42 having a bore 44 therein, said lug being secured, as by welding, to the outer channel 26. The dorsal fin 2 is provided with a bore 46 completely therethrough, a pair of doubler plates 48, one on each skin material surface, being employed on the interior of said fin whereby to reinforce the area surrounding said bore 46. The bores 44 and 46 are so arranged as to be in alignment when the fin 2 is in its assembled position, a locking pin 50 having an enlarged head 52 thereon being placed within said bores to insure that accidental disassembly does not occur. Said pin 50 may be secured by any desired means, such as by employing a force fit or by threads.

Figure 5:
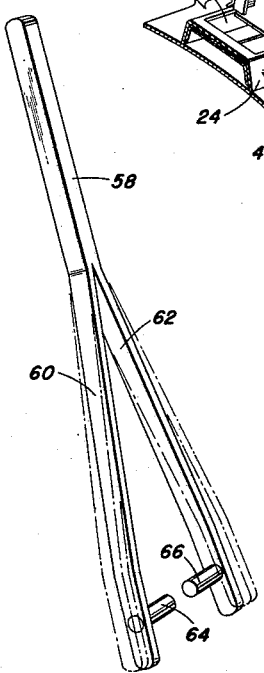
FIG. 5 is a perspective view of an assembly tool.

An assembly tool 58 is shown in FIG. 5, the purpose of which is to aid in the assembly of the fin 2 upon the missile body. Said assembly tool 58 includes a pair of diverging spring legs 60 and 62 which carry opposed pins 64 and 66, respectively, thereon. As shown by the broken lines in FIG. 5, the spring legs 60 and 62 may be sprung outwardly, after which they will return to the position shown in full lines.

Figure 3:
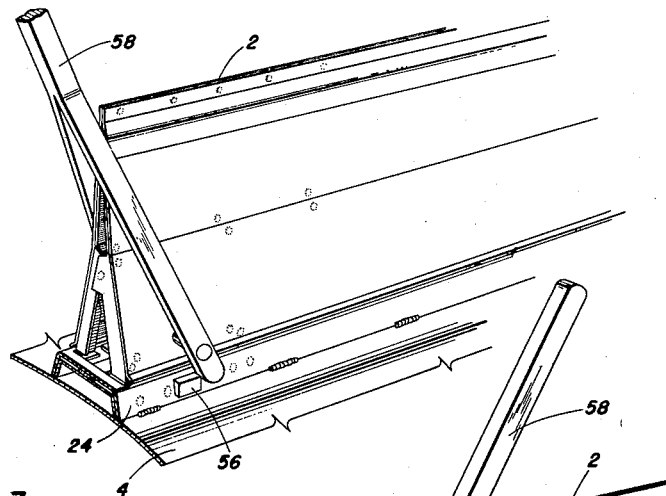
FIG. 3 is a perspective view of a dorsal fin and an aerial missile body in pre-assembly position.
Figure 4:
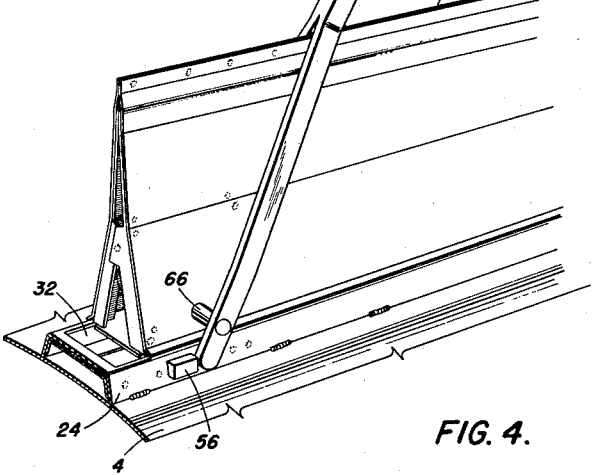
FIG. 4 is a perspective view of a dorsal fin and an aerial missile body in assembled position.

The use of the assembly tool is illustrated in FIGS. 3 and 4. The spring legs 60 and 62 are spread and the tool is placed over the dorsal fin 2, the pins 64 and 66 being fitted into opposite ends of the bore 46. The fin is then placed in the pre-assembly position, as shown in FIG. 3, with the lower ends of the spring legs 60 and 62 resting against a pair of stop blocks 54 and 56 carried by the outer channel 26. The assembly tool is then moved as a lever to the position shown in FIG. 4, thereby sliding the fin 2 into its secured position. The tool is then removed and the locking pin 50 inserted in position.

Obviously, many modifications and variations of the present invention are possible in the light of the above teachings. It is therefore to be understood that within the scope of the appended claims the invention may be practiced otherwise than as specifically described.

What is claimed is:

1. In an aerial vehicle, structure for attaching an aerodynamic surface to said vehicle, comprising an anchor strip secured to said vehicle and having at least one opening and at least one pair of spaced slots, said pair of slots being in communication with said opening, at least one rib secured to and projecting from said surface and having a pair of opposed, spaced, horizontally projecting feet at the lower end thereof, said opening and said slots being of a size to receive said lower end of said rib whereby said end may be moved through said opening and into said slots thereby to attach said surface to said body.

2. In an aerial vehicle, a body, an anchor strip secured to said body and having a plurality of spaced, aligned openings therein, there being a pair of spaced slots adjacent to and in communication with each of said openings, an aerodynamic surface, a plurality of spaced ribs secured to and projecting from said surface, each of said ribs including a pair of spaced rib legs and a pair of opposed, spaced, horizontally projecting feet at the lower end thereof, said openings each being of a size to receive therein a pair of said spaced rib legs with their attached feet and said slots being of a size and spacing to snugly receive therein a pair of said spaced rib legs.

3. The combination as recited in claim 2, including additionally lug means projecting from and attached to said anchor strip and having a bore therethrough, said surface having a bore therethrough so positioned as to be in alignment with said bore of said lug when said surface is assembled on said body, and a locking pin engageable in said bores for securing said surface in its assembled position.

4. The combination as recited in claim 3, including additionally stop blocks attached to said anchor strip, and an assembly tool, said tool including a pair of divergent spring legs having opposed pins thereon of a size to fit within said bore in said surface, said tool cooperating in the manner of a lever with said stop blocks and said bore in said surface to aid in the assembly of said surface to said body.

5. The combination as recited in claim 2, wherein said anchor strip includes an outer elongated member, an inner elongated member, and a spacer strip member positioned therebetween, said spacer strip having a thickness substantially the same as the thickness of said feet and a width less than the distance between said spaced feet, said feet being positioned between said inner member and said outer member when said spaced rib legs are disposed within said slots.

References Cited in the file of this patent

UNITED STATES PATENTS

| | | |
|---|---|---|
| 1,054,353 | Keenan | Feb. 25, 1913 |
| 2,041,546 | Hodgins | May 19, 1936 |
| 2,575,461 | North | Nov. 20, 1951 |

FOREIGN PATENTS

| | | |
|---|---|---|
| 1,169,008 | France | Sept. 8, 1958 |